Oct. 29, 1935.　　　　　G. DELPECH　　　　　2,019,046
METHOD AND MEANS OF MANUFACTURING HOLLOW ARTICLES
Filed July 6, 1933
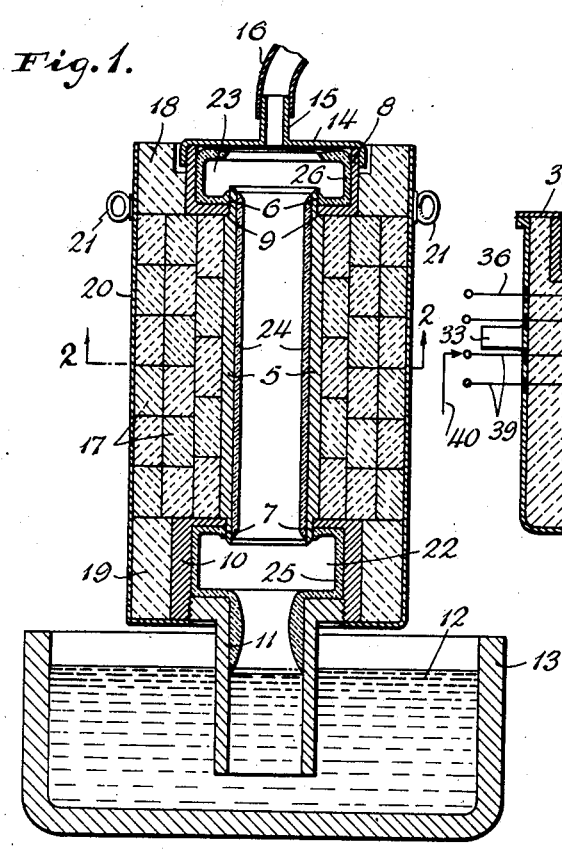
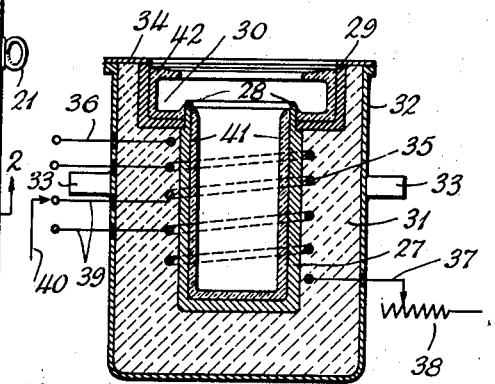
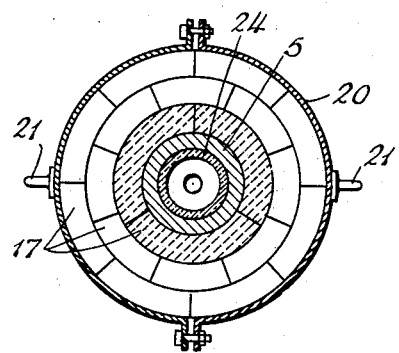
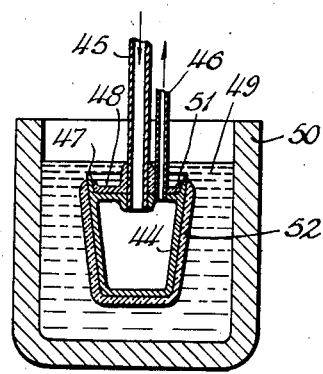
INVENTOR
GASTON DELPECH
BY Richards & Geier
ATTORNEYS

UNITED STATES PATENT OFFICE 2,019,046

METHOD AND MEANS OF MANUFACTURING HOLLOW ARTICLES

Gaston Delpech, Clamart, France, assignor to Societe Anonyme Des Manufactures Des Glaces & Produits Chimiques De Saint-Gobain, Chauny & Cirey, Paris, France Application July 6, 1933, Serial No. 679,208
In France July 13, 1932

14 Claims. (Cl. 49—31)

This invention relates to a method and means of manufacturing hollow articles consisting of refractory materials, such as alumina and its compounds, zirconia and its compounds, mixtures of silica and other oxides, and refers more particularly to a method and means of casting tubes, containers, crucibles or the like.

Hollow articles consisting of fusible refractory materials are usually manufactured by pouring the molten material into a mold which is made of metal or sand and has the shape of the article, which is to be manufactured. That part of the molten material, which is nearest to the walls of the mold, cools off more rapidly than the rest and forms a layer or a crust covering these walls. The rest of the molten material is then poured out of the mold and the crust is separated from the walls and cooled. This crust is then treated in various ways until an article of the desired form is produced.

Another method of manufacturing refractory containers or crucibles consists in immersing a suitably shaped core into the molten material and in maintaining this core in said material until parts of the latter form a crust or layer around the core. Then the core together with the crust is withdrawn from the molten material; the crust is separated from the core and is then cooled and suitably treated.

It was found that the articles cast by these methods have an extremely rough and irregular surface and that the thickness of the various parts of the article may vary to a very large extent. Another drawback of the articles produced by these methods is that they often have a great many rough or chipped edges.

It is quite difficult to apply any kind of mechanical means to the crust for the purpose of producing an article having smooth side walls of a uniform thickness. This difficulty is caused by the extreme hardness of the material out of which the articles are made, particularly if electro-thermical means are used in the course of the casting.

An object of the present invention is to eliminate these disadvantages and to provide a new, simple and efficient method of casting hollow articles.

Another object is the provision of a method of casting containers, crucibles, tubes or similar hollow articles of a substantially uniform thickness.

A further object is the provision of means cooperating with the contacting surfaces of a mold or core and regulating the exchange of heat between these surfaces and the adjacent molten material in such a way, that articles of a uniform thickness and having smooth rounded edges are formed.

Yet another object of this invention is to eliminate castings having rough or chipped portions and to provide a method and means of manufacturing articles having smooth rounded edges.

The above and other objects of this invention may be realized through the use of molds or cores, which are preferably made of compressed graphite or of graphite cakes and which are provided with means for maintaining those parts of the mold or core, which were used for the forming of the edges of the casting, at a temperature substantially equal to that of the molten material. In accordance with the present invention the mold or the core is also provided with means for regulating the exchange of heat taking place in the course of the formation of the crust. Preferably, the regulation of the temperature of the contacting surfaces of the mold or core takes place not only during the time when these surfaces are in contact with the molten material, but also some time before and after such contact. Due to this regulation of the heat exchange, the time necessary for the formation of the crust may be varied at will.

The cooling of the various parts of the mold or core may be regulated by covering those surfaces of the mold or core, which do not come in contact with the molten material, and are situated opposite to the contacting surfaces, with one or more removable layers or coatings of a heat insulating material having a certain predetermined thickness. The same result may be obtained by circulating a cooling or a heating fluid having a predetermined temperature along such surfaces of the core or mold, or through the use of regulatable electrical resistances.

Preferred means for maintaining those portions of the contacting surfaces of the mold and core, which were formerly used for the casting of the edges of the article, at a temperature substantially equal to that of the molten material, consist in the provision of a container carried by the mold or core and having side surfaces which are situated close to the above-described portions of the contacting surfaces of the mold or core. When the molten material is poured into the mold or when the core is immersed into the molten material, the container is filled by said material, which transmits its heat to the adjacent portions of the contacting surfaces of the mold or core. Since these portions of the contacting surfaces are also heated in the usual way through their contact with the molten material, they receive nearly twice the amount of heat than is transmitted to the remaining portions of the contacting surfaces. Due to this arrangement, these portions will be maintained at a much higher temperature than the remaining portions of the contacting surfaces with the result that the edges of the casting will be smooth and rounded and that the casting will have no rough edges.

The invention will appear more clearly from the following detailed description when taken in connection with the accompanying drawing showing preferred embodiments of the inventive idea.

In the drawing:

Figure 1 shows a mold in vertical cross-section.

Figure 2 is a section along the line 2—2 of Figure 1, looking in the direction of the arrows.

Figure 3 is a vertical section through a mold provided with electrical means for regulating the exchange of heat.

Figure 4 is a vertical section through a core immersed into the molten material.

The device illustrated in Figures 1 and 2 of the drawing is adapted for the manufacture of tubular articles. It comprises a tubular mold 5, which is preferably made of graphite. The projecting edges 6 and 7 of the tubular mold 5 are thinner than the remaining portions of the tube 5. An annular container 8, which is preferably made of graphite, is situated above the tube 5 and is carried by abutments 9 of said tube. The edges 6 of the tube 5 project beyond the bottom of the container 8. The edges 6 and the bottom and the side walls of the container 8 form an annular chamber 23, which can be filled with a liquid material. A somewhat similar container 10 is situated below the tube 5. The edges 7 of the tube 5 extend lower than the upper surface of the container 10 with the result that an annular chamber 22 is formed by these edges 7 along with the top and the side surfaces of the container 10. The container 10 which is also preferably made of graphite, is screwed onto a graphite tube 11. The lower end of the tube 11 is immersed into the molten material 12 carried by the pit or the container 13.

A cover 14 is provided with a tube 15 and is situated on top of the container 8. The tube 15 is connected with a pipe 16, which leads to an air pump not shown in the drawing.

The tube 5 is surrounded by a number of concentrical removable heat insulators 1. As shown in Figure 1 of the drawing, the number and the thickness of the heat insulators 17 can be varied at will. The containers 8 and 10 are surrounded by heat insulators 18 and 19, respectively. The heat insulators 17, 18 and 19 are surrounded by a cylindrical metal shell 20, which may consist of a number of separate parts and which is provided with handles 21.

The device operates as follows:

In order to fill the mold with the molten material, the pipe 16 is connected with means, which withdraw the air from the interior of the hollow tube 5. The molten material will then rise in the tube 11 and will gradually fill in the chamber 22 formed by the container 10, the interior of the tube 5 and the chamber 23 formed by the container 8. Some of the molten material will adhere to the surfaces of the tube 5 and will form a crust 24 covering these surfaces. The molten material within the chamber 22 will form a crust 25 covering the walls of this chamber, while the liquid material reaching as far as the chamber 23 will form a crust 26. The crust 24 covering the walls of the tube 5 is separated from the crusts 25 and 26 by the projecting edges 7 and 6, respectively. Portions of the crust or semi-liquid material 25, which are close to the edges 7, will transmit their heat to these edges. On the other hand, these edges will also be heated by the adjacent portions of the crust 24, with the result that the edges 7 will be much hotter than the middle portions of the tube 5. Due to this arrangement, the crust 24 will have rounded smooth edges and will have no chipped portions.

The container 8 is used to obtain the same results at the other end of the tube 5. The molten material filling the container 8 and forming a crust 26 along the walls of this container, will transmit its heat to the edges 6, which will be much hotter than the middle portions of the tube 5. Due to this high temperature of the edges 6, those portions of the crusts 24, which are adjacent to the edges 6, will have smooth rounded ends and will not have any chipped edges.

The heat exchange between the main portions of the tube 5 and the crust 24 adhering to the inner surfaces of the tube 5, may be regulated at will by providing a smaller or a larger number of heat insulators 17. The temperature of the tube 5 may be maintained at a lower level by providing a smaller number of heat insulators or by using a material, which will readily transmit heat. On the other hand, the temperature prevailing at the inner surfaces of the tube 5 may be increased by increasing the number of heat insulators and/or by using a material having powerful heat-insulating properties.

After a crust 24 of the desired thickness has been formed, the pipe 16 is connected to an air blowing device, which is not shown in the drawing. The air introduced into the chambers 22 and 23 and the interior of the tube 5 will force the liquid portions of the molten material to flow back into the container 13. The crusts 25 and 26, formed within the chambers 22 and 23 may be removed, remelted and then returned to the molten material 12. The crust 24, which has the shape of the article to be manufactured, is taken out of the tube 5 and is then treated in the usual manner.

The device shown in Figure 3 of the drawing may be used for the manufacture of crucibles or articles of a similar shape. The device comprises a mold 27, which is preferably made of graphite and which is provided with thin edge portions 28. A graphite container 29 is situated above the mold 27. The edges 28 of the mold 27 project beyond the bottom of the container 29 thus forming an annular chamber 30, which is limited by the bottom and the side walls of the container 29 and the edges 28 of the mold 27. The container 29 and the mold 27 are surrounded by an insulator 31 which is provided with an outer shell or cover 32. The shell 32 has two handles 33 and is provided with a cover 34 placed over the space between the side walls of the container 29 and the adjacent portions of the shell 32.

An electrical coil 35 surrounds the mold 27 and is connected at its two ends with electrical wires 36 and 37, respectively. The wires 36 and 37 lead to a source of electrical energy not shown in the drawing. An adjustable resistance 38 may be interposed between the wire 37 and the source of electrical energy for the purpose of varying the strength of electrical current flowing through the coil 35. A number of wire leads 39 may be connected with different windings of the coil 35. The wire 40 connected with one of the poles of the source of electrical energy, may be so arranged that it can be connected with any one of the wires 39 or with the wire 36.

In order to form an article having the shape of the mold 27, the molten material is poured into it until it fills said mold as well as the annular chamber 30 situated above the mold 27. The molten material is allowed to remain there until a crust 41 has been formed on the inner surfaces of the mold 27. The amount of heat transmitted through the insulating material 31 may be diminished by passing an electrical current through the windings of the electrical coil 35. The heat emitted by the coil 35 will compensate some of the heat lost by the mold 27 with the result that a constant predetermined temperature will be maintained at the mold 27. The amount of heat emitted by the coil 35 may be changed at will by operating the resistance 38. If for some reasons it is desired to maintain a different temperature at different parts of the mold 41, the wire 40 may be connected with any one of the wires 39 with the result that the electrical current will pass only through a certain portion of the coil 35, while other portions of said coil will have no electrical current and will not be heated.

The molten material will also fill the container 29 so that the edges 28 of the mold 27 will be surrounded on both sides by the hot molten material. The temperature of these edges will therefore be the same or only slightly lower than the temperature of the molten material itself with the result that no crust will be formed at the outer parts of the edges 28. The ends of the crust 41 formed at the inner surfaces of the mold 27 will be round and smooth and will not have any chipped parts.

In the course of the process of solidification, a solid or a semi-liquid crust 42 will be formed around the walls of the container 29. After the crust 41, adhering to the walls of the mold 27, has reached the desired thickness, the entire mold is raised by means of the handles 33 and is turned upside down, with the result that the liquid superfluous portions of the molten material are poured out. The crust 41, which has the shape of the object to be manufactured, is then taken out of the mold 27 and is treated in the usual manner. The crust 42 may be melted again and added to the remaining liquid mass of molten material.

The device shown in Figure 4 of the drawing illustrates the so-called dipping method used for the manufacture of smaller articles, such as crucibles or the like. The device comprises a hollow core 44 provided with two tubes 45 and 46 leading into the interior of said core. The core 44 is preferably made of graphite and is provided with projecting ridges or edges 47 formed on the top of the core and surrounding an annular chamber 48. In operation, the core 44 is immersed into the molten material 49 situated in a container or pit 50. A fluid of any suitable type may be introduced into the core 44 through the tube 45 and then removed through the tube 46. If, for instance, the operator desires to shorten the process of solidification as much as possible, he may cause a cooling fluid such as cooled air or any other gas, to circulate through the interior of the core 44. If, on the other hand, it is desired to maintain the exterior surfaces of the core 44 at a high temperature, a hot gas may be introduced into the interior of the core 44 through the tube 45. This hot gas may be ignited and may form a flame, which will heat the inner surfaces of the core 44.

The projecting edges 47 of the core 44 will be heated by the crust 51 formed within the annular chamber 48 as well as by the crust 52 adhering to the exterior walls of the core 44. The temperature of the edges 47 will be higher than that of the remaining portions of the core 44 with the result that the edges of the crust 52 will be smooth and round and will not have any chipped portions.

As soon as the crust 52 of the desired thickness is formed, the core 44 is withdrawn from the molten material 49. The crust 51, formed around the walls of the annular space 48 is removed, and may be added again to the molten material 49. The crust 52, which has the shape of the article, is then separated from the core 44 and is treated in the usual manner.

What is claimed is:

1. In a method of casting hollow articles or articles with thin edges, the steps of bringing a molten material in contact with surfaces having the shape of the casting, said molten material solidifying in the form of a crust covering said surfaces, regulating the amount of heat lost by said material in the course of the solidification, and maintaining those portions of the contacting surfaces, which are close to the edges of said crust, at a temperature which is substantially higher than the temperature of the remaining portions of said surfaces.

2. In a method of casting hollow articles or articles with thin edges, the steps of bringing a molten material in contact with surfaces having the shape of the casting, said molten material solidifying in the form of a crust covering said surfaces, regulating the temperature of the contacting surfaces and maintaining those portions of the contacting surfaces, which are close to the edges of said crust, at a temperature which is substantially equal to the temperature of the molten material.

3. In a method of casting hollow articles or articles with thin edges, the steps of bringing a molten material in contact with surfaces having the shape of the casting, said molten material solidifying in the form of a crust covering said surfaces, and supplying an additional amount of heat to those portions of the contacting surfaces, which are close to the edges of said crust, whereby said portions are maintained at a temperature which is substantially equal to the temperature of the molten material.

4. Means for casting hollow articles or articles with thin edges, comprising a mold, provided with surfaces having the shape of a casting, said mold having edges situated adjacent to the edges of said casting, a container connected with said mold and surrounding the edges of said mold, and a removable layer of a heat-insulating material surrounding said mold and said container.

5. Means for casting hollow articles or articles with thin edges, comprising a mold, provided with surfaces having the shape of a casting, said mold having edges situated adjacent to the edges of said casting, a container connected with said mold and surrounding the edges of said mold, a layer of a heat-insulating material surrounding said container, and a plurality of concentrical removable layers of a heat-insulating material surrounding said mold.

6. Means for casting hollow articles or articles with thin edges, comprising a mold, provided with surfaces having the shape of a casting, said mold having edges situated adjacent to the edges of said casting, a container connected with said mold and surrounding the edges of said mold, an electrical resistance surrounding said mold, and an insulator surrounding said resistance and said container.

7. Means for casting holow articles or articles with thin edges, comprising a mold, provided with surfaces having the shape of a casting, said mold having edges situated adjacent to the edges of said casting, a container connected with said mold and surrounding the edges of said mold, an electrical resistance surrounding said mold, means regulating the length of the resistance flown by an electrical current, means regulating the strength of said current, and an insulator surrounding said resistance and said container.

8. Means for casting hollow articles or articles with thin edges, comprising a tubular member provided with inner surfaces having the shape of the casting, said tubular member having a middle portion, an upper edge and lower edge, said edges being substantially thinner than said middle portion; a container at the upper end of said member, said upper edge projecting beyond the bottom of said container, another hollow member surrounding said lower edge, heat insulation surrounding said container and the second-mentioned member, a plurality of removable heat-insulating rings surrounding the first-mentioned member, some of said rings being concentrical, a container for the molten material and means for establishing a communication between the interior of the second-mentioned hollow member and said molten material.

9. Means for casting hollow articles, or articles with thin edges, comprising a hollow member provided with surfaces having the shape of a casting and adapted to come into contact with molten material, said hollow member having other surfaces adapted to transmit an amount of heat from said molten material, means adjacent to the second-mentioned surfaces for varying the amount of heat transmitted through the second-mentioned surfaces, and a container connected with said member and having side surfaces which are situated adjacent to the edges of said casing.

10. Means for casting hollow articles and other articles with thin edges, comprising a mold having side surfaces with an axial extension adapted to come interiorly in contact with a molten material, and a container connected with said mold and arranged so as to enclose said extension, said extension extending a substantial distance into said container, said container being adapted to contain an additional supply of said molten material, whereby additional heat is supplied from the molten material in said container to the outside of said extension and to the molten material in contact with the inside of said extension.

11. Means for forming thin edges of articles from molten siliceous or refractory materials, comprising a mold or form having side surfaces adapted to come in contact with the molten material and provided with a fin-like extension from the end of said side surfaces to form said thin edges, a container for said molten material, one wall of which is formed by the other side of said fin than that which contacts with and forms said thin edge, and means for simultaneously contacting molten material with said form and placing it in said container.

12. Means for casting hollow articles and other articles with thin edges, comprising a tubular vertical mold having side surfaces and fin-like vertical heat-transmitting end extensions adapted to come in contact with a molten material, said extensions forming said thin edges, said molten material being adapted to solidify to form said articles and a container connected with said mold and concentrical in relation thereto, said container having walls formed in part at least by the opposite side of said extensions than that which contacts with the molten material, said container being adapted to contain an additional supply of said molten material, whereby additional heat is supplied from the molten material in said container to said extensions and to the molten material in contact with said extensions, an opening being formed at the lower end of said mold for the removal of the articles and the superfluous molten material.

13. Means for casting hollow articles and other articles with thin edges, comprising a tiltable mold having side surfaces and fin-like vertical heat-transmitting end extensions adapted to come in contact with a molten material, said extensions forming said thin edges and a container connected with said mold and concentrical in relation thereto, said container having walls formed in part at least by the opposite side of said extensions than that which contacts with the molten material, said container being adapted to contain an additional supply of said molten material, whereby additional heat is supplied from the molten material in said container to said extensions and to the molten material in contact with said extensions.

14. Means for casting hollow articles and other articles with thin edges comprising a hollow mold having outer side surfaces and fin-like vertical heat-transmitting end extensions adapted to come in contact with a molten material, said extensions forming said thin edges, means connected with said mold for cooling the interior thereof, and a container connected with said mold and concentrical in relation thereto, said container having walls formed in part at least by the opposite side of said extensions than that which contacts with the molten material, said container being adapted to contain an additional supply of said molten material, whereby additional heat is supplied from the molten material in said container to said extensions and to the molten material in contact with said extensions.

GASTON DELPECH.